United States Patent
Zimmerman

(10) Patent No.: US 11,611,104 B2
(45) Date of Patent: *Mar. 21, 2023

(54) SOLID ELECTROLYTE HIGH ENERGY BATTERY

(71) Applicant: IONIC MATERIALS, INC., Woburn, MA (US)

(72) Inventor: Michael A. Zimmerman, North Andover, MA (US)

(73) Assignee: Ionic Materials, Inc., Woburn, MA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/893,001

(22) Filed: Jun. 4, 2020

(65) Prior Publication Data

US 2020/0303773 A1 Sep. 24, 2020

Related U.S. Application Data

(60) Continuation of application No. 15/723,630, filed on Oct. 3, 2017, now Pat. No. 10,741,877, which is a division of application No. 13/861,170, filed on Apr. 11, 2013, now Pat. No. 9,819,053.

(60) Provisional application No. 61/622,705, filed on Apr. 11, 2012.

(51) Int. Cl.
| | |
|---|---|
| *H01M 10/0565* | (2010.01) |
| *H01M 10/0525* | (2010.01) |
| *B29C 48/00* | (2019.01) |
| *C08J 5/22* | (2006.01) |
| *B29C 48/154* | (2019.01) |
| *H01M 8/1069* | (2016.01) |
| *H01M 8/1032* | (2016.01) |
| *H01M 8/10* | (2016.01) |

(52) U.S. Cl.
CPC ....... *H01M 10/0565* (2013.01); *B29C 48/022* (2019.02); *B29C 48/154* (2019.02); *C08J 5/2256* (2013.01); *H01M 10/0525* (2013.01); *C08J 2381/04* (2013.01); *H01M 8/1032* (2013.01); *H01M 8/1083* (2013.01); *H01M 2008/1095* (2013.01); *H01M 2300/0082* (2013.01)

(58) Field of Classification Search
CPC ......... H01M 6/181; H01M 6/185–188; H01M 8/1018; H01M 8/102; H01M 8/1032; H01M 8/1041–1055; H01M 8/1065–1093; H01M 10/0565
See application file for complete search history.

(56) References Cited

U.S. PATENT DOCUMENTS

| | | |
|---|---|---|
| 2,638,489 A | 5/1953 | Ruben |
| 3,257,241 A | 6/1966 | Tamminen |
| 3,336,279 A | 8/1967 | Scott |
| 3,502,606 A | 3/1970 | Conciatori et al. |
| 4,243,732 A | 1/1981 | Powers et al. |
| 4,465,744 A | 8/1984 | Susman et al. |
| 4,471,037 A | 9/1984 | Bannister |
| 4,556,165 A | 12/1985 | Yamawacki et al. |
| 4,654,279 A | 3/1987 | Bauer et al. |
| 4,720,910 A | 1/1988 | Rourke et al. |
| 4,804,594 A | 2/1989 | Low et al. |
| 4,925,751 A | 5/1990 | Shackle et al. |
| 5,147,739 A | 9/1992 | Beard |
| 5,160,880 A | 11/1992 | Palanisamy |
| 5,169,494 A | 12/1992 | Hashimoto et al. |
| 5,227,043 A | 7/1993 | Shakushiro et al. |
| 5,270,137 A | 12/1993 | Kubota |
| 5,378,560 A | 1/1995 | Tomiyama |
| 5,403,675 A | 4/1995 | Ogata et al. |
| 5,424,151 A | 6/1995 | Koksbang et al. |
| 5,462,566 A | 10/1995 | Skotheim |
| 5,506,073 A | 4/1996 | Angell et al. |

(Continued)

FOREIGN PATENT DOCUMENTS

| | | |
|---|---|---|
| CN | 1242877 A | 1/2000 |
| CN | 1285086 | 2/2001 |

(Continued)

OTHER PUBLICATIONS

International Search Report and the Written Opinion of the International Search Authority, dated Feb. 26, 2015, from PCT/US2014/068338, filed on Dec. 3, 2014. (Year: 2015).*
International Search Report and the Written Opinion of the International Search Authority, dated Oct. 26, 2016, from PCT/US2016/035040, filed on May 31, 2016. (Year: 2016).*
Fedelich: "Application Handbook Thermal Analysis of Polymers Selected Applications Thermal Analysis," Jan. 1, 2013, XP55608279, URL: https://www.mt.com/dam/LabDiv/guides-glen/ta-polymer/TA_Polymers_Selected_Apps_EN.pdf.
Yi-Chun Lu, et al. "Catalytic Activity Trends of Oxygen Reduction Reaction for Nonaqueous Li-Air Batteries Supporting Information," Nov. 1, 2011, XP055630428, URL: https://pubs.acs.org/doi/suppl/10.1021/ja208608s/suppl_file/ja208608S-si_001.pdf.

(Continued)

*Primary Examiner* — Stephen E Rieth
(74) *Attorney, Agent, or Firm* — Burns & Levinson LLP; Joseph M. Maraia; Joseph P. Quinn

(57) ABSTRACT

The present invention is directed to a battery including a solid ionically conductive polymer electrolyte having a first surface and a second surface; a first electrode disposed on the first surface of the solid ionically conductive polymer electrolyte; a second electrode disposed on the second surface of the solid ionically conductive polymer electrolyte; and at least a first conductive terminal and a second conductive terminal, each terminal being in electrical contact with respectively the first conductive electrode and the second conductive electrode. The invention is also directed to a material including a polymer; a dopant; and at least one compound including an ion source; wherein a liberation of a plurality of ions from the ion source provides a conduction mechanism to form an ionically conductive polymer material. The present invention is further directed to methods for making such batteries and materials.

8 Claims, 14 Drawing Sheets

(56) References Cited

U.S. PATENT DOCUMENTS

| | | | |
|---|---|---|---|
| 5,518,841 A | 5/1996 | Sotumura | |
| 5,569,559 A | 10/1996 | Fauvarque et al. | |
| 5,582,937 A | 12/1996 | LaFollette | |
| 5,599,355 A | 2/1997 | Nagasubramanian et al. | |
| 5,620,811 A | 4/1997 | Zhang et al. | |
| 5,648,187 A | 7/1997 | Skotheim | |
| 5,660,953 A | 8/1997 | Bai et al. | |
| 5,688,613 A | 11/1997 | Li et al. | |
| 5,713,169 A | 2/1998 | Meier et al. | |
| 5,882,621 A | 3/1999 | Doddapaneni et al. | |
| 5,888,672 A | 3/1999 | Gustafson et al. | |
| 5,917,693 A | 3/1999 | Kono et al. | |
| 5,989,742 A | 3/1999 | Cabasso et al. | |
| 6,074,773 A | 6/2000 | Wilkinson et al. | |
| 6,162,563 A | 6/2000 | Miura et al. | |
| 6,110,619 A | 8/2000 | Zhang et al. | |
| 6,183,914 B1 | 2/2001 | Yao et al. | |
| 6,248,474 B1 | 6/2001 | Nishiyama et al. | |
| 6,274,681 B1 | 6/2001 | Inagaki et al. | |
| 6,274,261 B1 | 8/2001 | Tinker et al. | |
| 6,358,651 B1 | 3/2002 | Chen | |
| 6,376,123 B1 | 4/2002 | Chu | |
| 6,451,487 B1 | 4/2002 | Besner et al. | |
| 6,413,676 B1 | 7/2002 | Munshi et al. | |
| 6,461,724 B1 | 7/2002 | Radovanovic et al. | |
| 6,455,202 B1 | 9/2002 | Marugan et al. | |
| 6,630,271 B1 | 10/2003 | Arcella et al. | |
| 6,664,006 B1 | 10/2003 | Munshi | |
| 6,645,675 B1 * | 11/2003 | Munshi | H01M 10/0565 429/305 |
| 6,652,440 B1 | 11/2003 | Kovalev et al. | |
| 6,727,343 B2 | 4/2004 | Morris et al. | |
| 7,070,882 B1 | 7/2006 | Ferrando | |
| 7,455,935 B2 | 11/2008 | Abe et al. | |
| 7,651,647 B1 | 1/2010 | Strange et al. | |
| 8,227,105 B1 | 7/2012 | Gerald, II et al. | |
| 8,753,594 B1 | 6/2014 | Burba, III et al. | |
| 8,906,556 B2 | 6/2014 | Hambitzer | |
| 8,877,376 B2 | 11/2014 | Wakizaka et al. | |
| 8,945,432 B2 | 2/2015 | Towns, deceased | |
| 9,742,008 B2 * | 8/2017 | Zimmerman | H01M 4/624 |
| 9,819,053 B1 | 11/2017 | Zimmerman | |
| 10,199,657 B2 | 2/2019 | Zimmerman | |
| 10,553,901 B2 | 2/2020 | Zimmerman et al. | |
| 10,741,877 B1 * | 8/2020 | Zimmerman | B29C 48/022 |
| 10,811,688 B2 * | 10/2020 | Zimmerman | H01M 4/622 |
| 11,114,655 B2 * | 9/2021 | Zimmerman | H01M 10/0565 |
| 11,145,857 B2 * | 10/2021 | Zimmerman | H01G 11/50 |
| 11,145,899 B2 * | 10/2021 | Zimmerman | H01M 4/505 |
| 11,152,657 B2 * | 10/2021 | Zimmerman | H01M 4/624 |
| 2001/0003863 A1 | 6/2001 | Thibault et al. | |
| 2002/0010261 A1 | 1/2002 | Callahan et al. | |
| 2002/0048706 A1 | 4/2002 | Mayes et al. | |
| 2002/0177043 A1 | 11/2002 | Ndzebet et al. | |
| 2003/0013012 A1 | 1/2003 | Ahn et al. | |
| 2003/0069343 A1 | 4/2003 | Smith et al. | |
| 2003/0138702 A1 | 7/2003 | Gerald, II et al. | |
| 2003/0162087 A1 | 8/2003 | Clarke et al. | |
| 2003/0209692 A1 | 11/2003 | Farrand et al. | |
| 2004/0023116 A1 | 2/2004 | Fujino et al. | |
| 2004/0076881 A1 | 4/2004 | Bowden et al. | |
| 2004/0157101 A1 | 8/2004 | Smedley | |
| 2004/0229118 A1 | 11/2004 | Wensley et al. | |
| 2004/0241553 A1 | 12/2004 | Abe et al. | |
| 2004/0253520 A1 | 12/2004 | Wensley et al. | |
| 2005/0019661 A1 | 1/2005 | Han et al. | |
| 2005/0112458 A1 | 5/2005 | Dopp et al. | |
| 2005/0112471 A1 | 5/2005 | Chen et al. | |
| 2005/0164085 A1 | 7/2005 | Bofinger et al. | |
| 2005/0181280 A1 | 8/2005 | Ceder et al. | |
| 2005/0244696 A1 | 11/2005 | Kuromatsu et al. | |
| 2005/0287441 A1 | 12/2005 | Passerini et al. | |
| 2006/0004112 A1 | 1/2006 | Shimoyama et al. | |
| 2006/0166085 A1 | 7/2006 | Hennige et al. | |
| 2006/0269834 A1 | 11/2006 | West et al. | |
| 2007/0015047 A1 | 1/2007 | Hosaka et al. | |
| 2007/0020525 A1 | 1/2007 | Kim et al. | |
| 2007/0051366 A1 | 3/2007 | Hansmann et al. | |
| 2007/0166618 A1 | 7/2007 | Armand et al. | |
| 2007/0250036 A1 | 10/2007 | Volk et al. | |
| 2007/0287069 A1 | 12/2007 | Fukui | |
| 2008/0066297 A1 | 3/2008 | Lin et al. | |
| 2008/0090138 A1 | 4/2008 | Vu et al. | |
| 2008/0118826 A1 | 5/2008 | Shimamura et al. | |
| 2008/0199755 A1 | 8/2008 | Brotherston et al. | |
| 2008/0248356 A1 | 10/2008 | Kimura et al. | |
| 2008/0292953 A1 | 11/2008 | Hosaka et al. | |
| 2008/0300380 A1 | 12/2008 | Bai et al. | |
| 2009/0162755 A1 | 6/2009 | Neudecker | |
| 2009/0197183 A1 | 8/2009 | Kato | |
| 2009/0246636 A1 | 10/2009 | Chiang et al. | |
| 2009/0272731 A1 | 11/2009 | Olding et al. | |
| 2010/0227224 A1 | 9/2010 | Eitouni et al. | |
| 2011/0020708 A1 | 1/2011 | Fujiki et al. | |
| 2011/0027666 A1 | 2/2011 | Burchardt et al. | |
| 2011/0070487 A1 | 3/2011 | Padhi et al. | |
| 2011/0104511 A1 | 5/2011 | Okumura et al. | |
| 2011/0104571 A1 | 5/2011 | Zhamu et al. | |
| 2011/0111287 A1 | 5/2011 | Sayre et al. | |
| 2011/0204341 A1 | 8/2011 | Brown et al. | |
| 2011/0223477 A1 | 9/2011 | Nelson et al. | |
| 2011/0223518 A1 | 9/2011 | Hirakimoto | |
| 2011/0274983 A1 | 11/2011 | Yontz et al. | |
| 2011/0274990 A1 | 11/2011 | Xu | |
| 2011/0281158 A1 | 11/2011 | Tazoe | |
| 2011/0281159 A1 | 11/2011 | Farmer et al. | |
| 2011/0318646 A1 | 12/2011 | Babinec et al. | |
| 2012/0094250 A1 | 4/2012 | Lloyd et al. | |
| 2012/0107690 A1 | 5/2012 | Wakizaka et al. | |
| 2012/0115049 A1 | 5/2012 | Rinzler et al. | |
| 2012/0129045 A1 | 5/2012 | Gin et al. | |
| 2012/0171574 A1 | 7/2012 | Zhamu et al. | |
| 2012/0189897 A1 | 7/2012 | Wakizaka et al. | |
| 2012/0208091 A1 | 8/2012 | Tsai et al. | |
| 2012/0231355 A1 | 9/2012 | Lee et al. | |
| 2012/0321970 A1 | 12/2012 | Friesen et al. | |
| 2013/0084507 A1 | 4/2013 | Johnson | |
| 2013/0136981 A1 | 5/2013 | Peuchert et al. | |
| 2013/0149436 A1 | 6/2013 | Hsieh et al. | |
| 2013/0189589 A1 | 7/2013 | Hashaikeh et al. | |
| 2013/0216936 A1 | 8/2013 | Fuchs et al. | |
| 2013/0224632 A1 | 8/2013 | Roumi | |
| 2014/0004431 A1 | 1/2014 | Yamaguchi et al. | |
| 2014/0057153 A1 | 2/2014 | Visco et al. | |
| 2014/0059820 A1 | 3/2014 | Wright et al. | |
| 2014/0079995 A1 | 3/2014 | Wakada | |
| 2014/0088207 A1 | 3/2014 | Elabd et al. | |
| 2014/0141336 A1 | 5/2014 | Morin | |
| 2014/0227614 A1 | 8/2014 | Lee et al. | |
| 2014/0349160 A1 | 11/2014 | Kato et al. | |
| 2014/0377621 A1 | 12/2014 | Hanyu et al. | |
| 2015/0064574 A1 | 3/2015 | He et al. | |
| 2015/0064575 A1 | 3/2015 | He et al. | |
| 2015/0146452 A1 | 5/2015 | Kim et al. | |
| 2015/0155559 A1 | 6/2015 | Zimmerman et al. | |
| 2015/0180037 A1 | 6/2015 | Gronwald et al. | |
| 2015/0280218 A1 | 10/2015 | Zimmerman et al. | |
| 2015/0364791 A1 | 12/2015 | Vu et al. | |
| 2016/0028133 A1 | 1/2016 | Miles | |
| 2016/0118685 A1 | 4/2016 | Zhang et al. | |
| 2016/0233461 A1 | 8/2016 | Young et al. | |
| 2016/0233510 A1 | 8/2016 | Onodera | |
| 2016/0254514 A1 | 9/2016 | Roumi | |
| 2016/0365553 A1 | 12/2016 | Kountz et al. | |
| 2017/0005356 A1 | 1/2017 | Zimmerman | |
| 2017/0018781 A1 | 1/2017 | Zimmerman | |
| 2017/0092958 A1 | 3/2017 | Zimmerman et al. | |
| 2017/0271731 A1 | 9/2017 | Hayashi et al. | |
| 2017/0338492 A1 | 11/2017 | Zimmerman et al. | |
| 2018/0006308 A1 | 1/2018 | Zimmerman et al. | |
| 2018/0151910 A1 | 5/2018 | Zimmerman et al. | |
| 2018/0151914 A1 | 5/2018 | Zimmerman et al. | |
| 2018/0175372 A1 | 6/2018 | Zimmerman et al. | |
| 2018/0198124 A1 | 7/2018 | Zimmerman et al. | |

(56) References Cited

U.S. PATENT DOCUMENTS

| | | |
|---|---|---|
| 2018/0212232 A1 | 7/2018 | Zimmerman et al. |
| 2018/0219210 A1 | 8/2018 | Kim |
| 2018/0241031 A1 | 8/2018 | Pan et al. |
| 2019/0067764 A1 | 2/2019 | Zimmerman et al. |
| 2020/0358107 A9 | 11/2020 | Zimmerman |

FOREIGN PATENT DOCUMENTS

| | | | |
|---|---|---|---|
| CN | 1326596 | A | 12/2001 |
| CN | 1354529 | | 6/2002 |
| CN | 1372705 | A | 10/2002 |
| CN | 1457518 | | 11/2003 |
| CN | 1592937 | A | 3/2005 |
| CN | 1788375 | A | 6/2006 |
| CN | 1965436 | | 5/2007 |
| CN | 101290985 | | 10/2008 |
| CN | 101542790 | A | 9/2009 |
| CN | 106165154 | | 11/2016 |
| CN | 106489217 | | 3/2017 |
| CN | 107980185 | | 5/2018 |
| EP | 0145498 | | 6/1985 |
| JP | S59157151 | A | 9/1984 |
| JP | H04-267055 | A | 9/1992 |
| JP | H07-271074 | A | 10/1995 |
| JP | H09-219197 | | 8/1997 |
| JP | 2002538585 | A * | 11/2002 |
| JP | 2002-352799 | A | 12/2002 |
| JP | 2002358959 | A | 12/2002 |
| JP | 2003-242964 | A | 8/2003 |
| JP | 2003242961 | A | 8/2003 |
| JP | 2004/265675 | A | 9/2004 |
| JP | 2004265675 | | 9/2004 |
| JP | 2005/535076 | A | 11/2005 |
| JP | 2005535076 | | 11/2005 |
| JP | 2006-049122 | A | 2/2006 |
| JP | 2006-210089 | A | 8/2006 |
| JP | 2006520519 | A | 9/2006 |
| JP | 2007080642 | A | 3/2007 |
| JP | 2010509719 | | 3/2010 |
| JP | 2011-028976 | A | 2/2011 |
| JP | 2011-228219 | A | 11/2011 |
| JP | 2012517519 | A | 8/2012 |
| JP | 2012522336 | A | 9/2012 |
| JP | 2014-067638 | A | 4/2014 |
| JP | 2014-112560 | A | 6/2014 |
| JP | 2015005493 | A | 8/2015 |
| JP | 2015529945 | | 10/2015 |
| KR | 10-2008-0023294 | A | 3/2008 |
| KR | 10-2011-0106342 | A | 9/2011 |
| KR | 10-2012-0117853 | A | 10/2012 |
| WO | WO1998042037 | | 9/1998 |
| WO | WO1999033127 | | 7/1999 |
| WO | WO2000016422 | | 3/2000 |
| WO | 2001175051 | A1 | 3/2001 |
| WO | 2001026175 | A1 | 4/2001 |
| WO | WO2004027909 | | 4/2004 |
| WO | WO2004102694 | | 11/2004 |
| WO | WO2006019064 | | 2/2006 |
| WO | WO2010061452 | | 6/2010 |
| WO | WO2011146670 | | 11/2011 |
| WO | WO-2011146670 | A1 * | 11/2011 ......... H01M 10/052 |
| WO | WO2014020349 | | 2/2014 |
| WO | 2015084940 | | 6/2015 |
| WO | 2015153729 | A1 | 10/2015 |
| WO | 2016/196873 | A1 | 8/2016 |
| WO | 2016182884 | A1 | 11/2016 |
| WO | 2016196477 | A1 | 12/2016 |
| WO | WO2016196873 | | 12/2016 |
| WO | WO2016197098 | | 12/2016 |
| WO | 2019/065066 | A1 | 4/2019 |
| WO | WO2019065066 | | 4/2019 |
| WO | WO2019126532 | | 6/2019 |
| WO | WO2020005700 | | 1/2020 |

OTHER PUBLICATIONS

Japanese Office Action dated Dec. 1, 2021, Japanese Application No. 2018-562254 (3 pages).

OPI Online Courses, "Insulator, Semiconductor, Conductor," 2012.

Yi-Chun Lu, et al., "Platinum-Gold Nanoparticles: A Highly Active Bifunctional Electrocatalyst for Rechargeable Lithium Air Batteries," Submission to Journal of the American Chemical Society. 2010. 3 Pages.

Ahmad et al., Structural studies and ionic conductivity of lithium iodide-lithium tungstate solid electrolytes. Ionics, 2002, 8, pp. 433-438 (2002).

Barron et al. The Effect of Temperature on Conductivity Measurement. TSP, vol. 3. 2007. [retrieved on Aug. 9, 2016], Retrieved from the Internet: <URL:http://www.reagecon.com/pdf/technicalpapers/Effect_of_Temperature_ TSP-07 Issue3.pdf>. entire document.

Candlin, J. "Polymers" within "The Chemical Industry: Second Edition." Edited by Alan Heaton. 1994. Spring Science+Business Media Dordrecht, pp. 116-121.

Celazole® T-Series: Injection Molding Thermoplastic Polymers. Brochure of PBI Performance Products, Inc., 2013.

Chiu, H.-T. et al., "Intermolecular Interactions and Aggregated Structures in Poly(p-phenylene sulfide) Doped with Some Organic Acceptors," Kobunshi Ronbunshu, vol. 41, No. 9, pp. 525-529, 1984. English abstract only, p. 529.

Dang, T.D. et al., "Ionic Conductivity of Conjugated Water-Soluble Rigid-Rod Polymers," Journal of Polymer Science: Part B: Polymer Physics, vol. 31 pp. 1941-1950, 1993.

Definition of Dopant, http://www.merriam-webster.com/dictionary/dopant. Downloaded Oct. 8, 2015.

Definition of Nonflammable. Http://www.dictionary.com/browse/nonflammable?s+t. As viewed on Jun. 7, 2016.

Diez-Pascual, A. et al., "High-Performance Aminated Poly(phenylene sulfide)/ZnO Nanocomposites for Medical Applications," ACS Applied Materials & Interfaces 6, No. 13 (Jun. 13, 2014), pp. 10132-10145.

Edman et al., "Transport properties of the Solid Polymer Electrolyte System P(EO)nLiTFSI," Journal of Physical Chemistry B, vol. 104, No. 15, pp. 3476-3480 (2000).

Extended European Search Report, dated Dec. 13, 2018, from related European Patent Application No. 16808115.6, filed on Jun. 7, 2016.

Extended European Search Report, dated Oct. 5, 2018, from related European Patent Application No. 16804636.5, filed on Jan. 4, 2018.

Extended European Search Report, dated Oct. 8, 2018, from related European Patent Application No. 16804487.3, filed on Jan. 4, 2018.

Extended European Search Report, dated Oct. 9, 2018, from related European Application No. EP 16804233, filed on Jan. 2, 2018.

Ferrando, W.A., "Development of a Novel Composite Aluminum Anode," Journal of Power Sources, vol. 130, Issues 102, pp. 309-314, May 2004. Abstract only.

Florjanczyk, Z. et al., "Polymer-in-Salt Electrolytes Based on Acrylonitrile/Butyl Acrylate Copolymers and Lithium Salts," Journal of Physical Chemistry B, 2004, vol. 108, pp. 14907-14914.

Gal'perin et al., Determination of the crystallinity of polyvinylidene fluoride. Polymer Science: USSR 1970, 12, pp. 2133-2139 (1970).

Hayashi, A. et al., "Superionic glass-ceramic electrolytes for room-temperature rechargeable sodium batteries," Nature Communications, 3:856 (May 22, 2012) 1-5.

Imrie, C.T. et al., "Ion Transport in Glassy Polymer Electrolytes," lournal of Physical Chemistry B, vol. 103, pp. 4132-4138, 1999.

International Application No. PCT/US2019/063562 International Search Report dated Mar. 25, 2020.

International Search Report and the Written Opinion of the International Searching Authority, dated Apr. 5, 2018 from related PCT/US2018/015146 filed on Jan. 25, 2018.

Kosters, J. et al., "Ion Transport Effects in a Solid Polymer Electrolyte Due to Salt Substitution and Addition Using an Ionic Liquid," Journal of Physical Chemistry B, 2013, vol. 117, pp. 2527-2534.

Lee et al., PVDF-based nanocomposite solid polymer electrolytes; the effect of affinity between PVDF and filler on ionic conductivity. Composite Interfaces 2009, 16, 347-358.

(56) References Cited

OTHER PUBLICATIONS

Lefrou, C. et al., "Electrochemistry: The Basics, With Examples." Springer-Verlag Berlin Heidelberg, pp. 22-25, 2012.

Lesch, V. et al., "A Combined theoretical and experimental study of the Influence of Different anion ratios on lithium ion dynamics in ionic liquids," Journal of Physical Chemistry B, 2014, vol. 118, No. 26, pp. 7367-7375.

Liew, C.-W. et al., "Characterization of ionic liquid added poly(vinyl alcohol)-based proton conducting polymer electrolytes and electrochemical studies on the supercapacitors," International Journal of Hydrogen Energy, vol. 40, pp. 852-862, 2015.

Lithium Iodide Information. ChemBook. http://www.chemicalbook.com/ChemicalProductProperty_EN_cb8688141.htm. As viewed on Apr. 25, 2017.

Miyatake, K. et al., "Synthesis of poly(phenylene sulfide sulfonic acid) via poly(sulfonium cation) as a thermostable proton-conducting polymer," Macromolecules 29.21, pp. 6969-6971 (1996).

Moharram, M.A. et al., "Electrical Conductivity of Poly(acrylic acid)—Polyacrylamide Complexes," Journal of Applied Polymer Science, vol. 68, pp. 2049-2055, John Wiley & Sons, Inc. (1998).

PBI Information. Polymers: A Property Database 2017, CRC Press, Taylor & Francis Group (2017).

Polyacrylonitrile Information. ChemicalBook. http://www.chemicalbook.com/ChemicalProductProperty_USCB9199592.aspx. As viewed on Jan. 18, 2018.

210 Polymer Density Table. Scientific Polymer, http://scientificpolymer.com/density-of-polymers-by-density/. As viewed on Mar. 11, 2015.

Polyphenylene Sulfide Information. DIC Corporation, http://www.dic-global.com/us/en/products/pps/about.html. Downloaded on Jun. 8, 2016.

Polyvinylidenefluoride (PVDF) Information, Goodfellow, http://www.goodfellow.eom/E/Polyvinylidenefluoride.html. As viewed on Jan. 18, 2018.

Sandor, R.B., "PBI (Polybenzimidazole): Synthesis, Properties and Applications," High Performance Polymers, vol. 2, No. 1, pp. 25-37, 1990.

Sannigrahi, A. et al., "Tuning the Molecular Properties of Polybenzimidazole by Copolymerization," Journal of Physical Chemistry B, vol. 111, pp. 12124-12132, 2007.

Santhosh, P. et al., "Preparation and properties of new cross-linked polyurethane 215 acrylate electrolytes for lithium batteries," lournal of Power Sources 160, pp. 609-620, 12 pps. (2006).

Sigma-Aldritch Materials Science Products. Pi-conjugated Polymers, Jun. 5, 2014 (Jun. 5, 2014) [retrieced on Aug. 9, 2016], Retrieved from the Internet: <URL: http://www.sigmaaldrich.com/materials-science/material-science-products.html? TablePage=111775702>. entire document.

Solvay. Ryton PPS. Feb. 7, 2015 (Feb. 7, 2015) [retrieved on Aug. 9, 2016], Retrieved 217 from the Internet: <URL:http://www.solvay.com/en/markets-and-products/featured-products/Ryton-PPS.htmlf>. entire document.

Spry, R.J. et al., Anisotropic Ionic Conductivity of Lithium-Doped Sulfonated PBI, Journal of Polymer Science: Part B: Polymer Physics, 35, 2925-2933 ( 1997).

Suib, S.L., New and future developments in catalysis: Batteries, Hydrogen Storage and Fuel Cells. Elsevier B.V. Jul. 29, 2013, pp. 1-16.

Supplementary European Search Report dated Oct. 15, 2018, from counterpart European National Phase Application No. EP 16808165.1, filed Jun. 8, 2016.

Supplementary European Search Report, dated Apr. 5, 2017, from related European Patent Application No. 14868257, filed Dec. 3, 2014.

Taib, N. U. et al., "Plastic crystal-solid biopolymer electrolytes for rechargeable lithium batteries," Journal of Membrane Science, vol. 468, pp. 149-154, 2014.

Teng, H., "Overview of the development of the fluoropolymer Industry," Applied Sciences, 2012, vol. 2, pp. 496-512.

Tokito et al., Electrical Conductivity and Optical Properties of Poly(p-phenylene sulfide) 224 doped with Some Organic Acceptors.

Polymer lournal, vol. 17, No. 8, pp. 959-968.1985. Retrieved from the lnternet<URL:HTTP:// www.nature.com/pj/ journal/vl7/n8/pdf/pj 1985103a.pdf.> entire document.

Translated Text of the First Office Action, dated Aug. 7, 2018, from related Chinese Patent Application No. 2015/80018411.6.

Wikipedia entry of Electrolyte. https://en.wikipedia.org/wiki/Electrolyte. Downloaded Nov. 10, 2015.

Singapore Intellectual Property Office—Written Opinion, dated Jul. 31, 2018, from related Singapore Patent Application No. SG2018/4525517527Y.

Wu, G.M. et al., "Alkaline Zn-air and Al-air cells based on novel solid PVA/PM polymer electrolyte membranes," Journal of Membrane Science, 280, pp. 802-808, Elsevier B.V. (2006; published online Apr. 4, 2006).

Wu, Y., ed., "Chapter 11: Solid Electrolyte." In Lithium Ion Battery Application and Practice, Chemical Industry Press, China: Chemical Industry Press, 2011. Cited in Third Office Action for CN 2015/80018411.6. Art is summarized in the attached foreign Office Action citing the art, and a translation of the summary with a copy of the translator signature is attached.

Yang, Y. et al., "Effect of Lithium Iodide Addition on Poly(ethylene oxide)-Poly(vinylidene fluoride) Polymer-Blend Electrolyte for dye-Sensitized Nanocrystalline Solar Cell," Journal of Physical Chemistry B, vol. 112, pp. 6594-6602, (2008).

Zhang, Z. et al., "All-solid-state Al-air batteries with polymer alkaline gel electrolyte," Journal of Power Sources., 251, pp. 470-475, Elsevier B.V (2014; available online Nov. 20, 2013).

Brady, D.G. "The crystallinity of poly(phenylene sulfide) and its effect on polymer properties," Journal of Applied Polymer Science, 1976, 20, 2541-2551.

Croce et al., "Nanocomposite polymer electrolytes for lithium batteries," Nature, vol. 394, pp. 456-458 (Jul. 30, 1998).

Diez-Pascual, A.M. et al., "Inorganic nanoparticle-modified poly(phenylene sulphide)/carbon fiber laminates: thermomechanical behaviors," Materials, 2013, 6, pp. 3171-3193.

International Search Report and Written Opinion, dated Oct. 2, 2019 for PCT/US2019/038190, filed on Jun. 20, 2019.

Japanese Office Action in Japanese Application No. JP2016-560448, dated Mar. 19, 2019. pgs.).

Lefkowitz et al., "Influence of pH on the Reductive Transformation of Birnessite by Aqueous Mn(II)," Environmental Science & Technology, vol. 47, pp. 10364-10371, 2013.

Liu et al., "Effect of Preparation Methods on Crystallization Behavior and Tensile Strength of Poly(vinylidene fluoride) Membranes," Membranes, 2013, 3, 389-405.

Lu, Cuihong and Pan, Chunyue, "A Review on Factors Influencing Ionic Conductivity of Polymer Electrolyte," Materials Reports, pp. 58-60, 38, Apr. 17, 2003. Chinese with English translation.

Nohara, L. B. et al., "Study of crystallization behavior of poly(phenylene sulfide)," Polimeros: Ciencia etecnologia, 16, pp. 104-110 (2006).

Persson et al., "Materials Data on Mn02 (SG:164) by Materials Project," database entry #mp-25558, Nov. 2014 [retrieced via <https://doi.org/10.17188/1200755>].

Polystyrene, Wikipedia. https://en.wikipedia.org/wiki/Polystyrene. Downloaded Feb. 4, 2019.

European Search Report dated Oct. 15, 2019 in EP Application No. 16804233.1 (8 pps.).

Supplementary European Search Report, dated Oct. 9, 2018, from related European Patent Application No. 16804233.1, filed on May 31, 2016 (7 pps.).

Wang et al., "The effects of Mn loading on the structure and ozone decomposition activity of MnOx supported on activated carbon," Chinese Journal of Catalysis, vol. 35, No. 3, pp. 335-341 (Mar. 13, 2014).

Singapore Office Action, dated Dec. 13, 2019 for SG Patent Application No. 10201811811Y.

Ye et al., "Dictionary of Weapon Industry Science and Technology Exploder," edited by Ye Ying, National Defense Industry Press, published in Dec. 1991, pp. 13-134.

Yu et al., "Solution-combustion synthesis of epsilo-MnO2 for supercapacitors," Materials Letters, vol. 64, pp. 61-64 (Oct. 9, 2009).

(56) References Cited

OTHER PUBLICATIONS

Zak, A. K. et al., "Synthesis and characterization of a narrow size distribution of zinc oxide nanoparticles," International Journal of Nanomedicine, 6, pp. 1399-1403 (2011).

* cited by examiner

Extrusion Process

Schematic of solid polymer battery with PEO

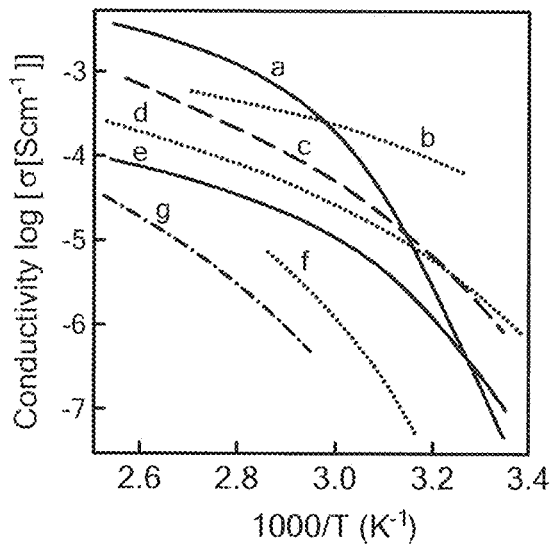

Conductivity of traditional polymers by ionic diffusion follows a Voegel-Tamman-Fulcher (VTF) relationship:

$\sigma = AT^{-1/2} \exp[-E_a/k_B(T-T_o)]$

Ionic Conductivity vs. temperature of traditional amorphous PEO polymer

FIG. 8
PRIOR ART

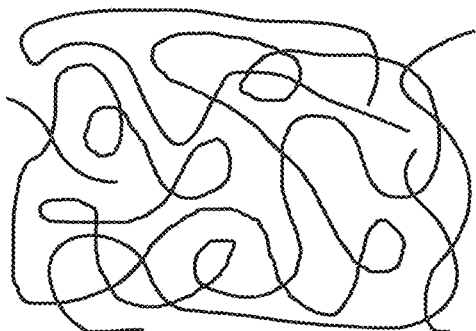 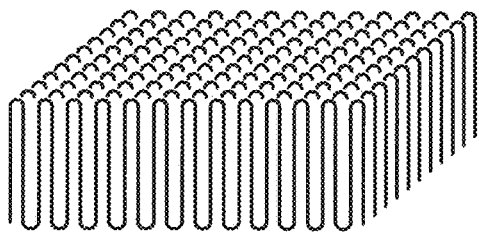

They can fold, and they can stack. A stack of polymer chains folded back on themselves like this is called a lamella.

Amorphous and Crystalline Polymers

FIG. 9

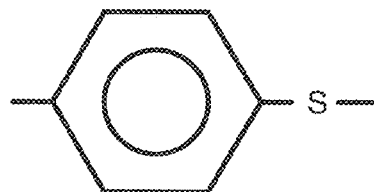

$ClC_6H_4Cl + Na_2S \rightarrow 1/n\ [C_6H_4S]_n + 2\ NaCl$

FIG. 10

| Compounds | A | B | C | D |
|---|---|---|---|---|
| Base Resin | | | | |
| Phillips-Chevron Ryton QC160N PPS | 80 wt% | 50 wt% | 67 wt% | 50 wt% |
| | | | | |
| Ion Source Fillers | | | | |
| Zinc Oxide, 20nm spheres | 20 wt% | 50 wt% | | |
| Lithium Oxide, milled to <2 micron | | | 33 wt% | 50 wt% |
Table 1
Exemplary formulations investigated.
*FIG. 12*
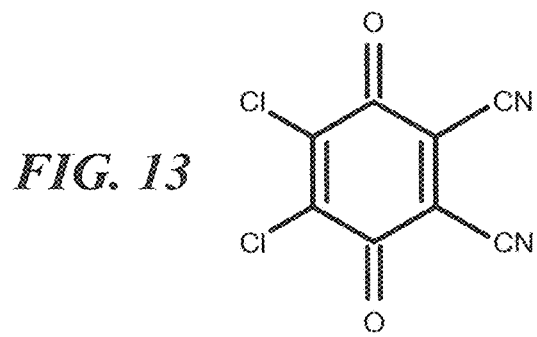
*FIG. 13*
2,3-dicyano-5,6-dichlorodicyanoquinone
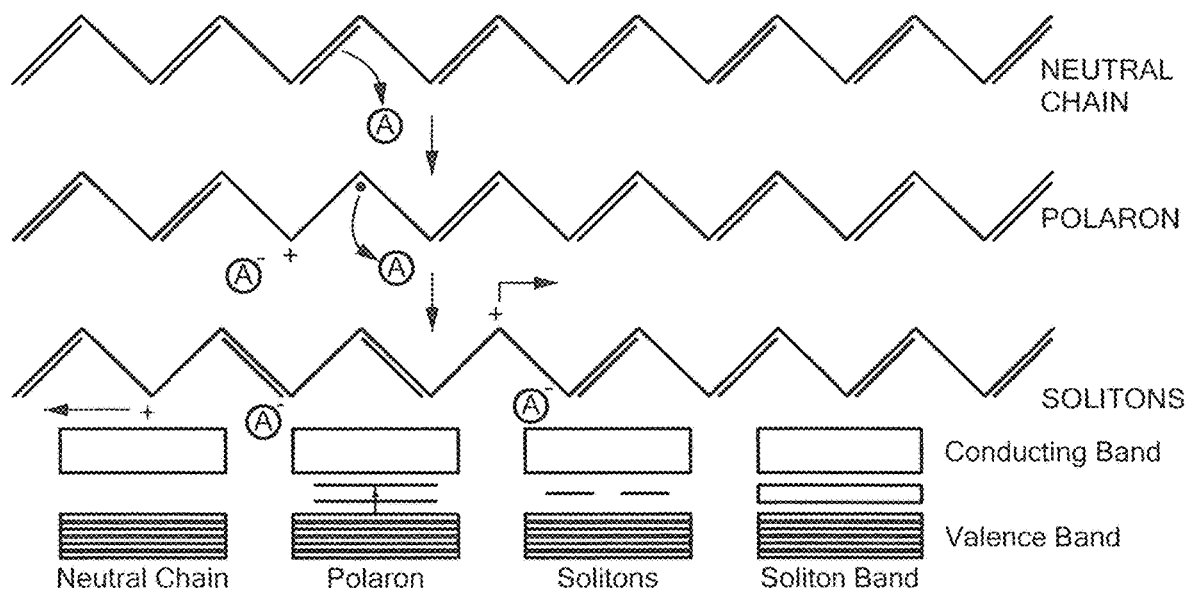
*FIG. 14*

Cyclic Voltammetry of Ionically Conductive Polymer versus Lithium Metal

Ionically conductive electrolyte and electrode components

Solid State Battery-Electrode and electrolyte bonded together

Flexible form of battery

SOLID ELECTROLYTE HIGH ENERGY BATTERY

STATEMENT REGARDING FEDERALLY SPONSORED RESEARCH OR DEVELOPMENT (Not applicable)

BACKGROUND OF THE INVENTION

Lithium ion (and other) batteries generally employ a liquid electrolyte which is hazardous to humans and to the environment and which can be subject to fire or explosion. Liquid electrolyte batteries are hermetically sealed in a steel or other strong packaging material which adds to the weight and bulk of the packaged battery. A new innovation is the pouch cell, which has been used in lightweight batteries, but these have not seen widespread acceptance.

Conventional liquid electrolyte also suffers from the build-up of a solid interface layer at the electrode/electrolyte interface which causes eventual failure of the battery. Conventional lithium ion batteries can also exhibit slow charge times on the order of hours. In addition, the batteries suffer from a limited number of recharges since the chemical reaction within the battery reaches completion and limits the re-chargeability because of corrosion and dendrite formation. The liquid electrolyte also limits the maximum energy density. The electrolyte starts to break down at about 4.2 volts. New industry requirements for battery power are often 4.8 volts and higher which cannot be achieved by present liquid electrolyte lithium ion cells. There have been developments in both spinel structures and layered oxide structures which have not been deployed due to the limitations of the liquid electrolyte. Also, lithium ion batteries with liquid electrolytes suffer from safety problems with respect to flammability of the liquid electrolyte.

In a conventional lithium ion battery having a liquid electrolyte there is also a need for a separator in the liquid electrolyte. The separator is a porous structure which allows for ions to flow through it, and blocks electrons from passing through it. The liquid electrolyte battery usually requires a vent to relieve pressure in the housing, and in addition, such conventional batteries usually include safety circuitry to minimize potentially dangerous over-currents and over-temperatures. FIGS. 1 and 2 show schematics and general reactions in such conventional lithium ion batteries.

BRIEF SUMMARY OF THE INVENTION

In accordance with the invention, a lithium ion battery is provided which has a solid polymer electrolyte. The solid electrolyte enables a lighter weight and much safer architecture by eliminating the need for heavy and bulky metal hermetic packaging and protection circuitry. The novel solid polymer battery can be of smaller size, lighter weight and higher energy density than liquid electrolyte batteries of the same capacity. The solid polymer battery also benefits from less complex manufacturing processes, lower cost and reduced safety hazard, as the electrolyte material is non-flammable. The novel battery will also provide cell voltages greater than 4.2 volts. The solid electrolyte can be formed into various shapes by extrusion (and co-extrusion), molding and other techniques such that different form factors can be provided for the battery. Particular shapes can be made to fit into differently shaped enclosures in devices or equipment being powered. In addition, the novel battery does not require a separator, as with liquid electrolyte batteries, between the electrolyte and electrodes, nor does the novel battery require a vent. The weight of the novel battery is substantially less than a battery of conventional construction having similar power capacity. In some embodiments, the weight of the novel battery can be less than half the weight of a conventional battery.

The electrolyte material is a solid ionically conductive polymer which has preferably a semi-crystalline or crystalline structure which provides a high density of sites for ionic transport. The polymer structure can be folded back on itself. This will allow for new battery formats.

According to one aspect of the invention, the electrolyte is in the form of an ionic polymer film. An electrode material is directly applied to each surface of the electrolyte and a foil charge collector or terminal is applied over each electrode surface. A light weight protective polymer covering can be applied over the terminals to complete the film based structure. This thin film battery is flexible and can be rolled or folded into intended shapes to suit installation requirements.

According to another aspect of the invention, the electrolyte is in the form of an ionic polymer monofilament (hollow). Electrode materials and charge collectors are directly applied (co-extruded) to each surface of the electrolyte and a terminal is applied at each electrode surface. A light weight protective polymer covering can be applied over the terminals to complete the structure. This form of battery is thin, flexible, and can be coiled into intended shapes to suit installation requirements, including very small applications.

According to another aspect of the invention, a solid electrolyte can be molded in a desired shape. Anode and cathode electrode materials are disposed on respective opposite surfaces of the electrolyte to form a cell unit. Electrical terminals are provided on the anode and cathode electrodes of each cell unit for interconnection with other cell units to provide a multi cell battery or for connection to a utilization device.

In yet other aspects of the invention, methods for making such batteries are disclosed.

In all of the above aspects of the invention, the electrode materials (cathode and anode) can be combined with a form of the novel electrolyte material to further facilitate ionic movement between the two electrodes. This is analogous to a conventional liquid electrolyte soaked into each electrode material in a conventional lithium-ion battery.

BRIEF DESCRIPTION OF THE SEVERAL VIEWS OF THE DRAWINGS

The foregoing summary, as well as the following description of the invention, is better understood when read in conjunction with the appended drawings. For the purpose of illustrating the invention, exemplary constructions are shown in the drawings. The invention is not limited, however, to the specific methods and instrumentalities disclosed herein.

FIG. 8 shows the relationship of ionic conductivity versus temperature of traditional amorphous polyethylene oxide according to the prior art.

FIG. 9 shows a schematic illustration of amorphous and crystalline polymers.

FIG. 10 exemplarily shows a resulting formula for the crystalline polymer of the present invention.

FIG. 12 exemplarily illustrates formulations which were investigated for use with the invention.

FIG. 13 exemplarily illustrates a chemical diagram of 2,3-dicyano-5,6-dichlorodicyanoquinone (DDQ).

FIG. 14 exemplarily illustrates possible mechanisms of conduction of the solid electrolyte polymer according to the invention.

DETAILED DESCRIPTION OF THE INVENTION

Figure 1:
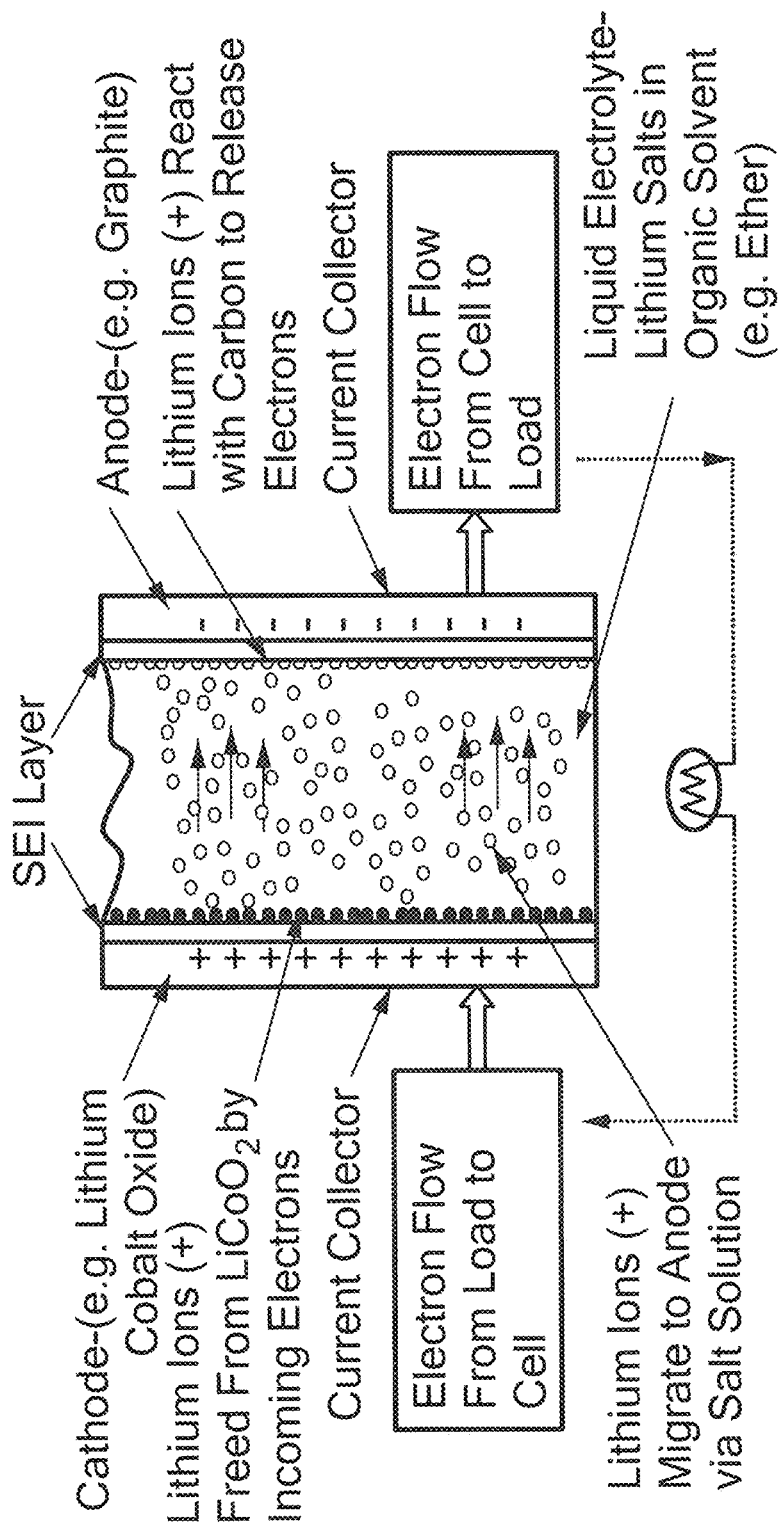
FIG. 1 shows show a schematic of a conventional lithium ion battery according to the prior art.
Figure 2:
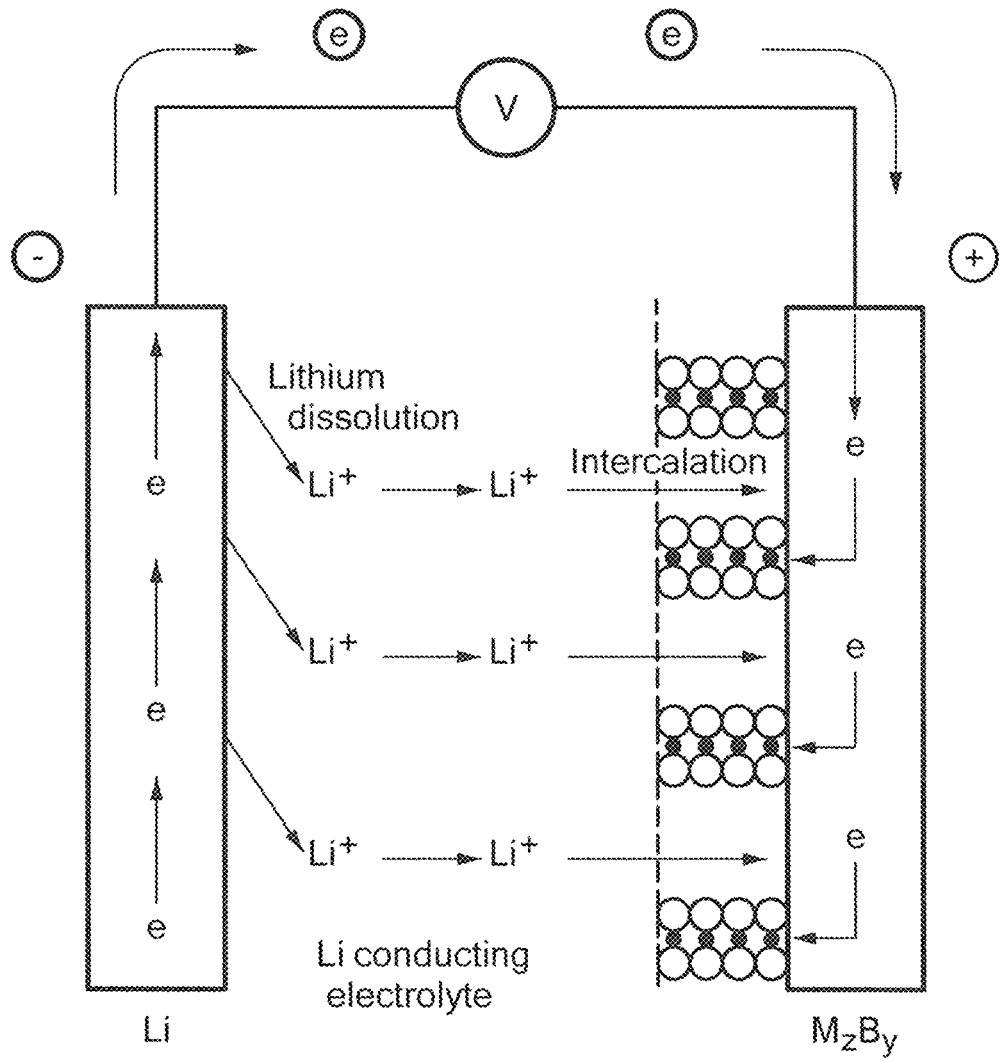
FIG. 2 shows reactions at electrodes in a conventional lithium ion battery according to the prior art.

The inventor has developed a non-flammable solid polymer electrolyte which is conductive at room temperature and can be used in any battery application. The material's novel conductivity mechanism improves energy density by 10-fold and reduces battery costs by up to 50%.

Existing solid state polymers used for ionic conductivity are based on alkali metals blended with polyethylene oxide (PEO). The three primary limitations with PEO are its temperature limitations, safety issues in commercial applications, and its manufacturability.

The limited temperature range of PEO. PEO according to the prior art is conductive only above the material's glass transition temperature (typically >50° C.); below that temperature it is in a glassy state and lacks conductivity. Above that temperature PEO exists in a visco-elastic state through which ions can conduct via chain mobility. Accordingly, the current blends of PEO with other materials used in laboratory and commercial applications all require high temperatures (>50° C.) to achieve the state necessary for the polymer to be reactive. This high temperature limits the kinds of applications PEO can be used in, even with necessary safety precautions for thermal runaway.

The flammability of PEO. PEOs according to the prior art are flammable, due to their volatile nature and high operating temperature. Currently, a battery utilizing PEO as an electrolyte requires a hermetic package around it to prevent thermal runaway. This adds an expensive thermal management system, adds safety risk to the end user, which can prevent end user adoption, and creates a rigid, bulky structure which the battery management system has to be designed around.

Manufacturability of PEO batteries. Commercial PEO manufacturers currently spray the polymer onto the electrodes during manufacturing. This batch-scale process is inefficient, and creates an end product that is stiff, thick, and costly to integrate into an end application. Moreover, although PEO has been in existence for over 20 years, it is still not commercially produced.

Liquid electrolytes embody many of the same problems as PEO as used in the prior art: high cost, safety concerns, cost and manufacturability challenges, poor mechanical properties and often a cause of performance degradation. The solid polymer approach of the present invention solves the problems associated with liquid electrolytes and addresses the limitations of PEO material.

The invention offers three key advantages in its polymer performance characteristics: (1) It has an expansive temperature range. In lab-scale testing, the crystalline polymer design has shown high ionic conductivity both at room temperature and over a wide temperature range. (2) It is non-flammable. The polymer self-extinguishes, passing the UL-V0 Flammability Test. The ability to operate at room temperature and the non-flammable characteristics demonstrate a transformative safety improvement that eliminates expensive thermal management systems. (3) It offers low-cost bulk manufacturing. Rather than spraying the polymer onto electrodes, the polymer material can be extruded into a thin film via a roll-to-roll process, an industry standard for plastics manufacturers. After the film is extruded, it can be coated with the electrode and charge collector materials to build a battery "from the inside out." This enables thin, flexible form factors without the need for hermetic packaging, resulting in easy integration into vehicle and storage applications at low cost.

The solid polymer electrolyte of the present invention is based on a transformative material that creates a new ionic conduction mechanism that provides a higher density of sites for ionic transport and allows higher voltages to run through the electrolyte with no risk of thermal runaway or damage to ion transport sites from lithiation. This characteristic enables a durable electrolyte for higher voltage cathode and anode materials in thin-film applications, resulting in higher energy densities for batteries in vehicle and stationary storage applications. The ability to run high voltages through an electrolyte that is conductive, mechanically robust, chemical and moisture resistant, and nonflammable not only at room temperature, but over a wide range of temperatures, will allow integration of high performance electrodes without costly thermal and safety mechanisms employed by the industry today.

Batteries prepared using the polymer electrolyte of the present invention are characterized by a 10-fold energy density improvement over current commercially available electrolytes, as well as a performance range of −40° C. to 150° C. with minimal conductivity degradation. The polymer electrolyte can be extruded by a process that produces working polymers at a thickness of 6 microns, which enables these traits in a thin-film format under commercial manufacturing conditions at batch scale. The polymer electrolyte allows the development of new, high throughput, low-cost manufacturing lines for solid electrolyte production, and can be integrated into a variety of product lines, including lithium and zinc battery manufacture. In addition, the polymer electrolyte is not limited to use in batteries, but can be used in any device or composition that includes an electrolyte material. For example, the polymer electrolyte material can be used in chemical separation processes, such as for the separation of ions, in electrochromic devices, electrochemical sensors, and fuel cell membranes.

Figure 3:
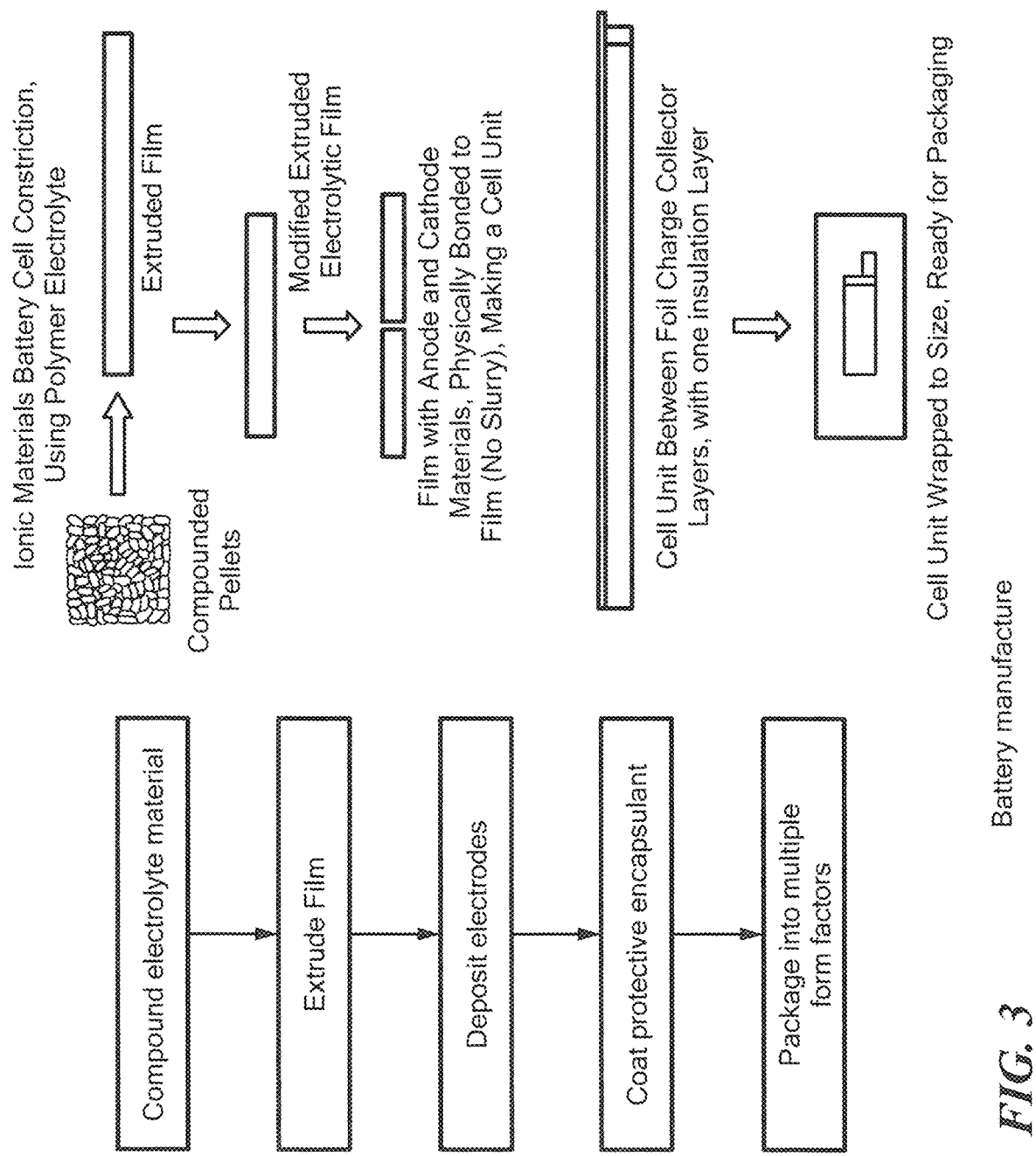
FIG. 3 exemplarily illustrates a method of the invention including steps for manufacturing a solid state battery using an extruded polymer.

FIG. 3 shows a method of manufacturing a solid state battery using an extruded polymer according to the invention. The material is compounded into pellets, and then extruded through a die to make films of variable thicknesses. The electrodes can be applied to the film using several techniques, such as sputtering or conventional casting in a slurry.

Figure 4:
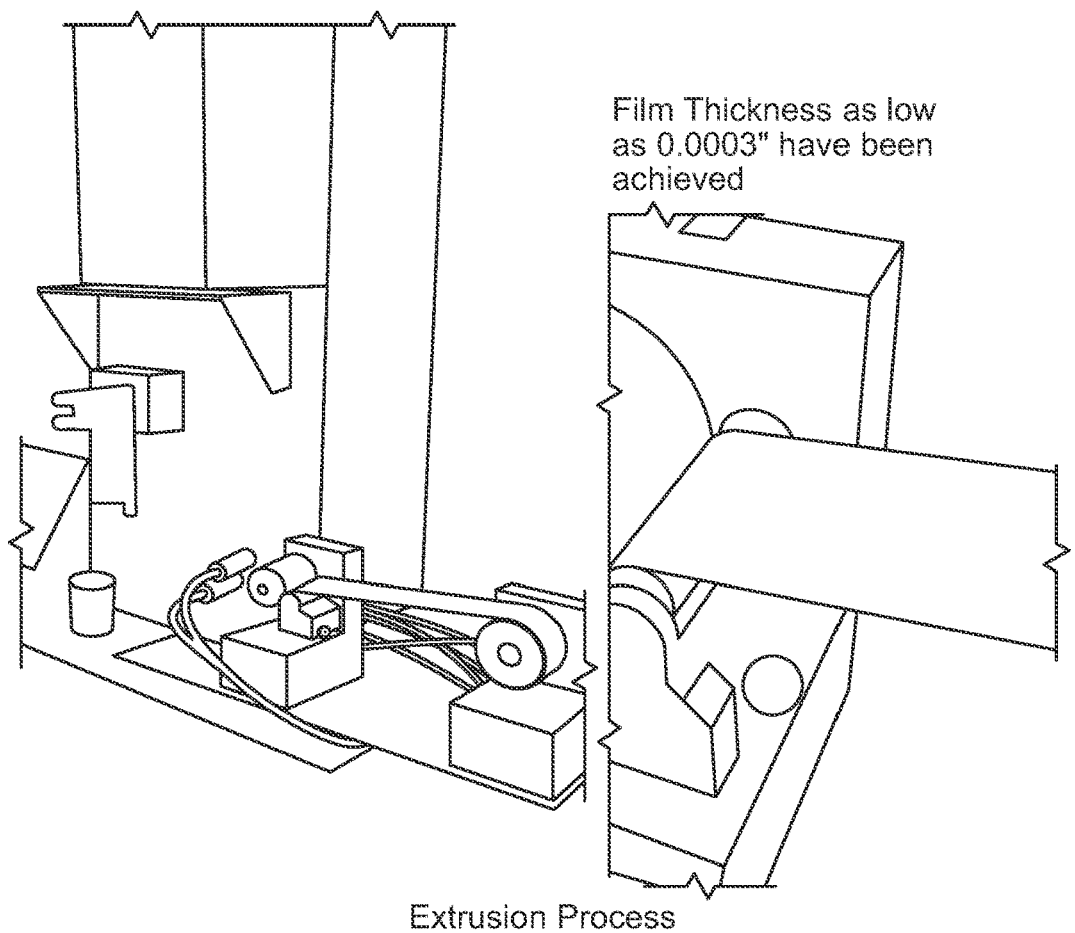
FIG. 4 exemplarily illustrates the extrusion process according to the invention.
Figure 5:
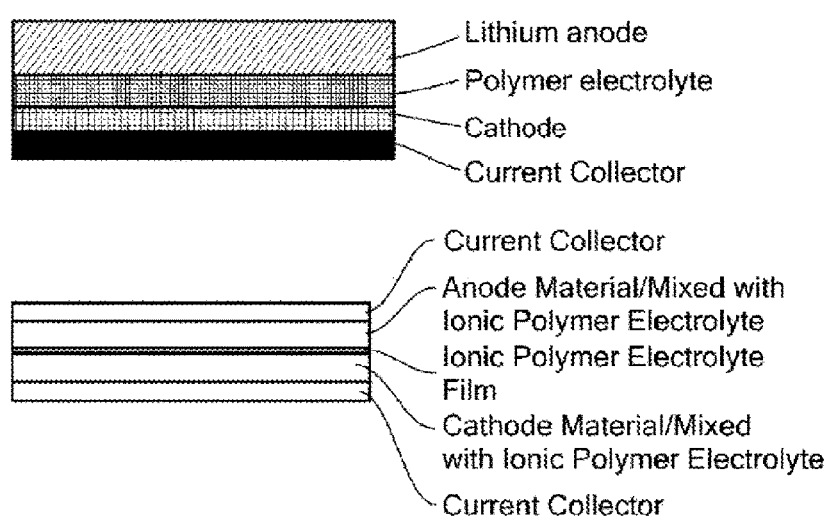
FIG. 5 exemplarily illustrates a schematic representation of an embodiment according to the invention.

FIG. 4 shows a method of manufacturing of an ionic polymer film according to the invention, which involves heating the film to a temperature around 295° C., and then casting the film onto a chill roll which freezes the plastic. The film can be very thin, in the range of 10 microns thick or less. FIG. 5 shows a schematic representation of the architecture of an embodiment according to the invention.

Figure 6:
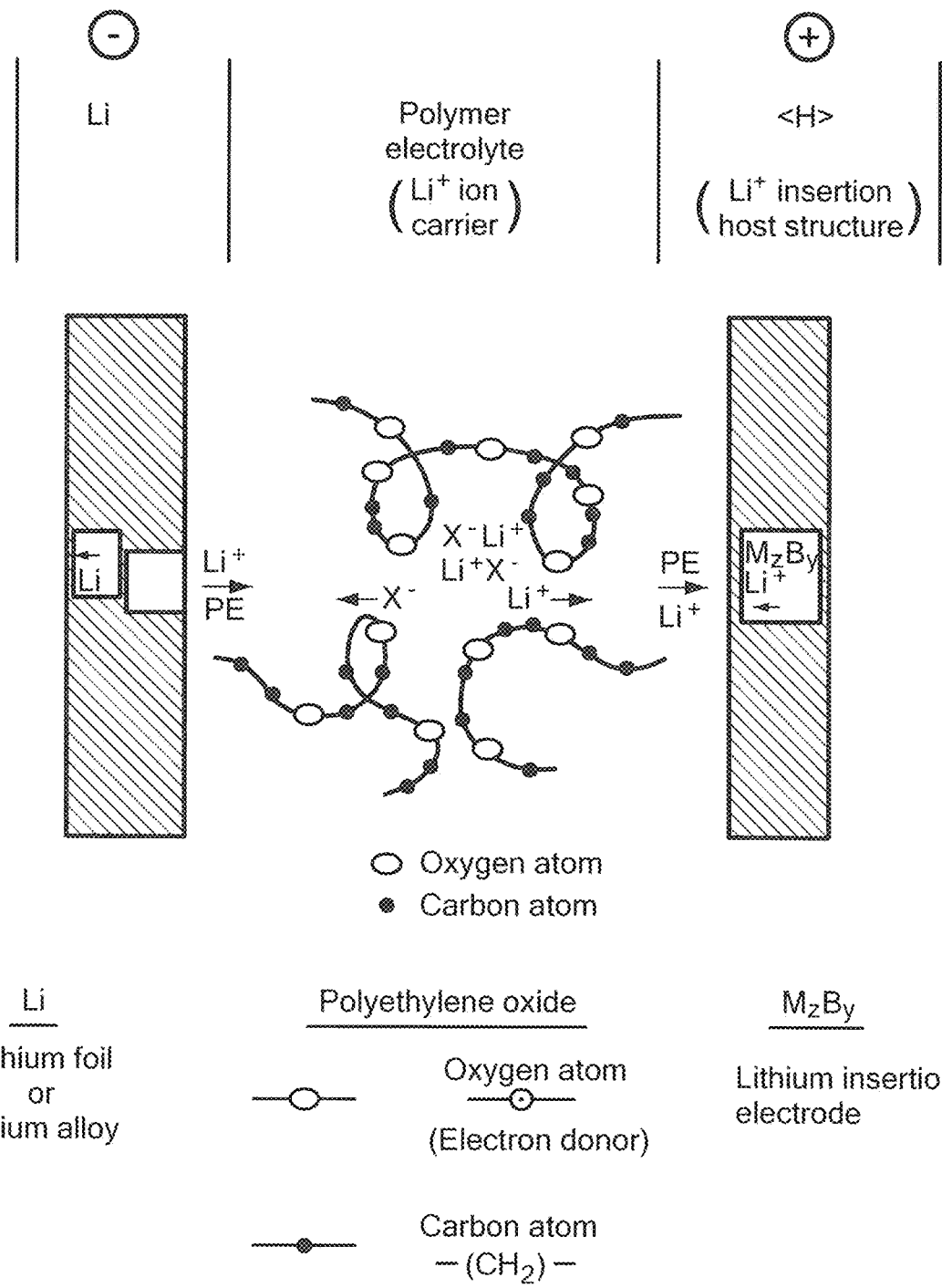
FIG. 6 shows a schematic of a solid polymer battery with polyethylene oxide according to the prior art.
Figure 7:
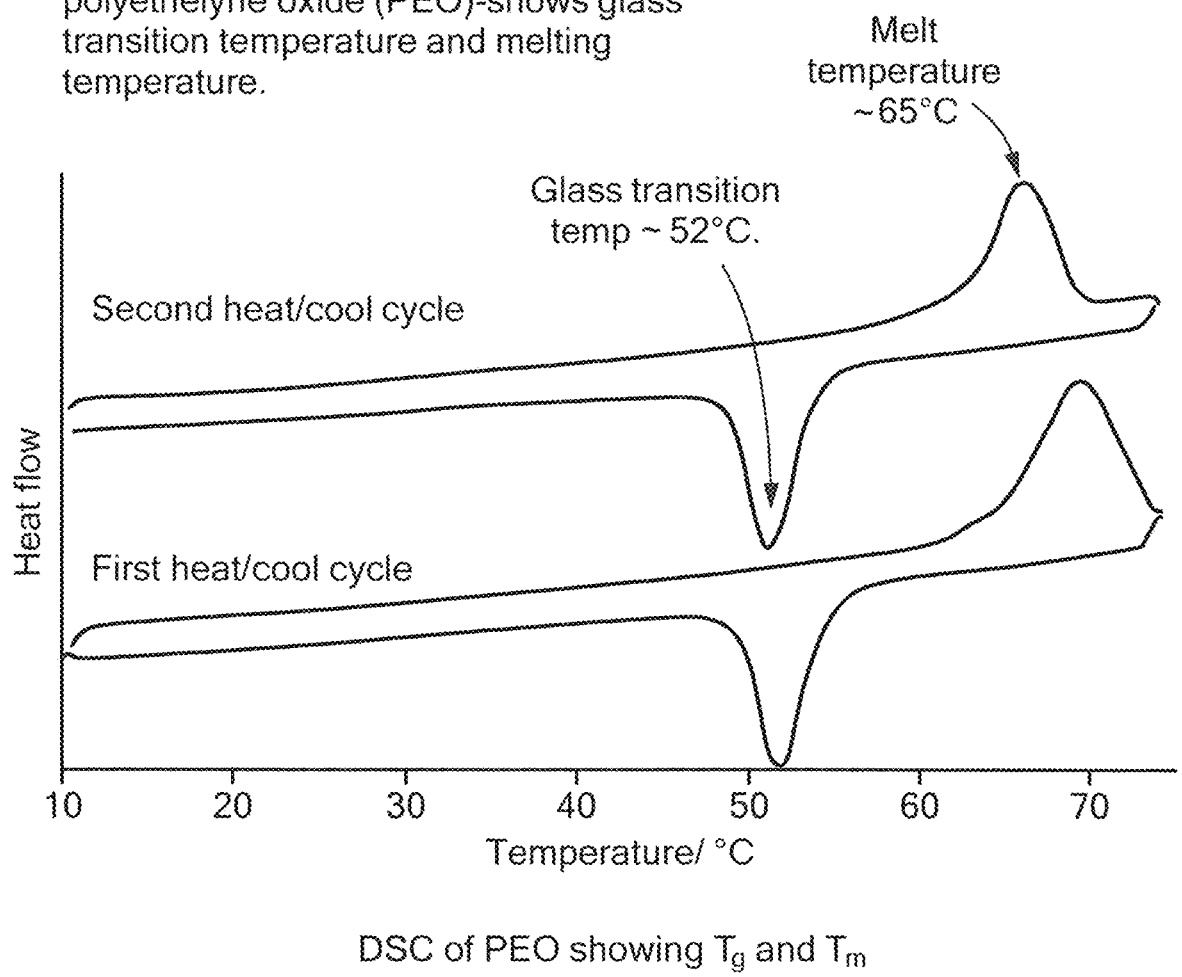
FIG. 7 shows a dynamic scanning calorimetry plot showing the glass transition temperature and melting temperature of polyethylene oxide according to prior art.

Previous attempts to fabricate polymer electrolytes were based on a specific ionically conductive material whose mechanism was discovered in 1973. The material is polyethylene oxide(PEO), and the ionic conduction mechanism is based on the "chain mobility" concept, which requires the polymer to be at a temperature higher than the glass transition temperature. FIG. 6 shows a schematic of a solid polymer battery with polyethylene oxide according to the prior art. Included in FIG. 7 is a dynamic scanning calorimetry (DSC) plot showing the glass transition temperature ($T_g$) and the melting temperature ($T_m$) of PEO.

The mechanism for ion transport involves "motion" of the amorphous chains above the $T_g$. Above this temperature the polymer is very "soft" and its mechanical properties are very low. For application in lithium ion batteries, traditional lithium ion salts are used as additives such as $LiPF_6$, $LiBP_4$, or $LiCLO_4$. Lithium salts are a source of issues in conventional Li ion batteries such as corrosion, reliability, and high cost. FIG. 8 is a plot which shows the relationship of ionic conductivity versus temperature of traditional amorphous polymer (PEO) according to the prior art. FIG. 8 shows that traditional amorphous polymer (PEO) does not have meaningful conductivity at room temperature.

The solid polymer electrolyte according to the invention has the following characteristics: ionic conduction mechanism at room temperature, wide temperature range, ion "hopping" from a high density of atomic sites, and a new means of supplying ions (lithium or otherwise)

The invention uses a "crystalline or semi-crystalline polymer", exemplarily illustrated in FIG. 9, which typically is above a crystallinity value of 30%, and has a glass transition temperature above 200° C., and a melting temperature above 250° C. Added to this are compounds containing appropriate ions which are in stable form which can be modified after creation of the film. FIG. 10 shows the molecular structure of the crystalline polymer. The molecular weight of the monomeric unit of the polymer is 108.16 g/mol.

Typical compounds for ion sources include, but are not limited to, $Li_2O$, $LiOH$, and $ZnO$. Other examples are $TiO_2$, $Al_3O_2$, and the like. Additionally other additives may be included to further enhance conductivity or current density, such as carbon nanotubes or the like. After the film is created, a doping procedure can be used, using an electron acceptor. Alternatively the dopant can be "pre-mixed" with the initial ingredients and extruded without post processing. The purpose of the electron acceptor is two-fold: release ions for transport mobility, and to create polar high density sites within the polymer to allow for ionic conductivity. Note: there is a clear distinction between electrical conductivity and ionic conductivity.

Figure 11:
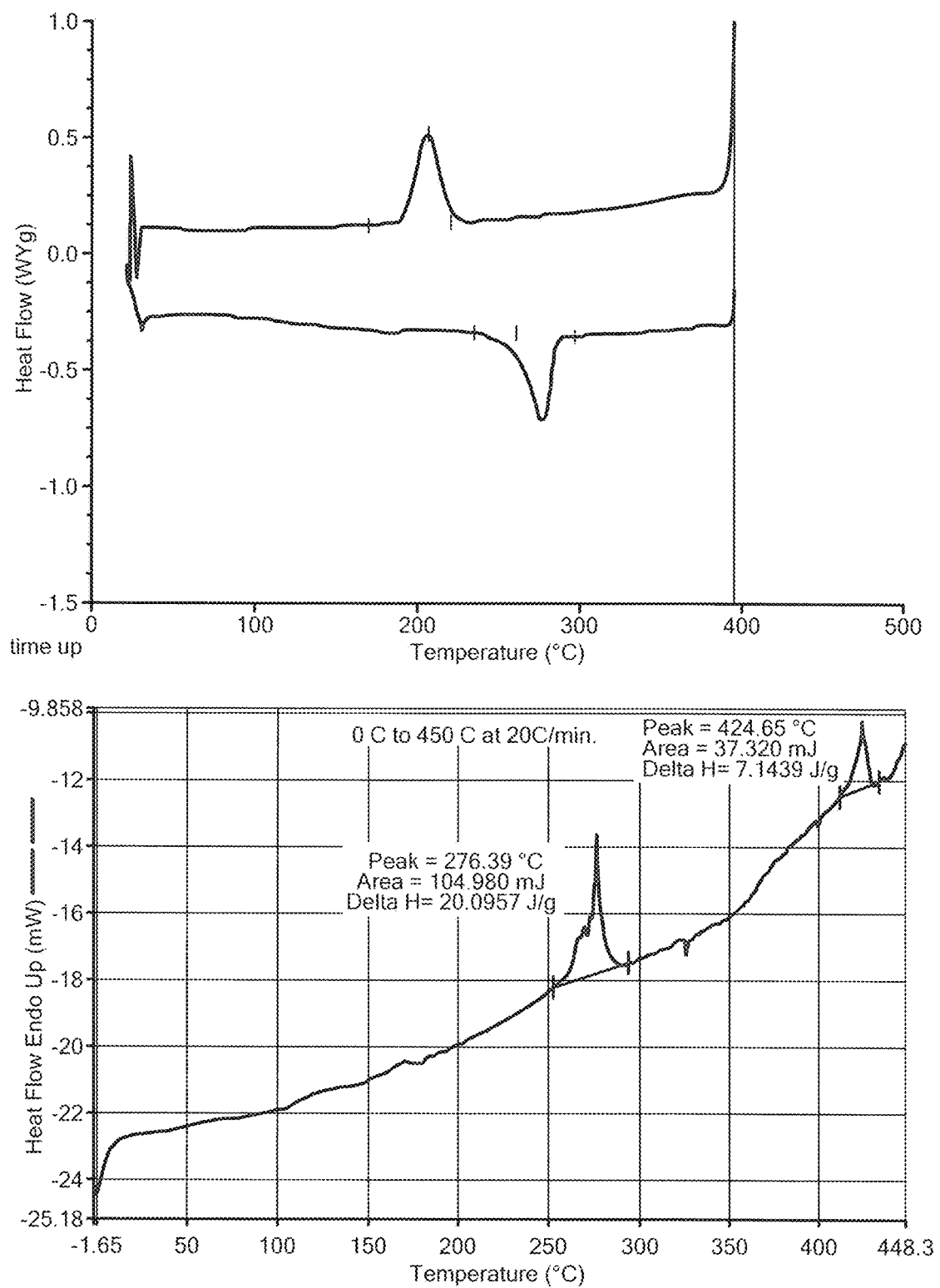
FIG. 11 exemplarily illustrates a dynamic scanning calorimeter curve of a semicrystalline polymer.

Typical materials that can be used for the polymer include liquid crystal polymers and polyphenylene sulfide (PPS), or any semicrystalline polymer with a crystallinity index greater than 30%, or other typical oxygen acceptors. FIG. 11 exemplarily illustrates a dynamic scanning calorimeter curve of a semicrystalline polymer. Table 1 of FIG. 12 illustrates exemplary formulations which were investigated.

Electron acceptors can be supplied in a vapor doping process. They can also be pre-mixed with the other ingredients. Typical electron acceptors suitable for use include, but are not limited to: 2,3-dicyano-5,6-dichlorodicyanoquinone (DDQ) ($C_8Cl_2N_2O_2$) as exemplarily illustrated in FIG. 13, Tetracyanoethylene (TCNE) ($C_6N_4$), and sulfur trioxide ($SO_3$). A preferred dopant is DDQ, and doping is preferably performed in the presence of heat and vacuum.

FIG. 14 shows possible mechanisms of conduction of the solid electrolyte polymer according to the invention. Charge carrier complexes are set up in the polymer as a result of the doping process.

Figure 15:
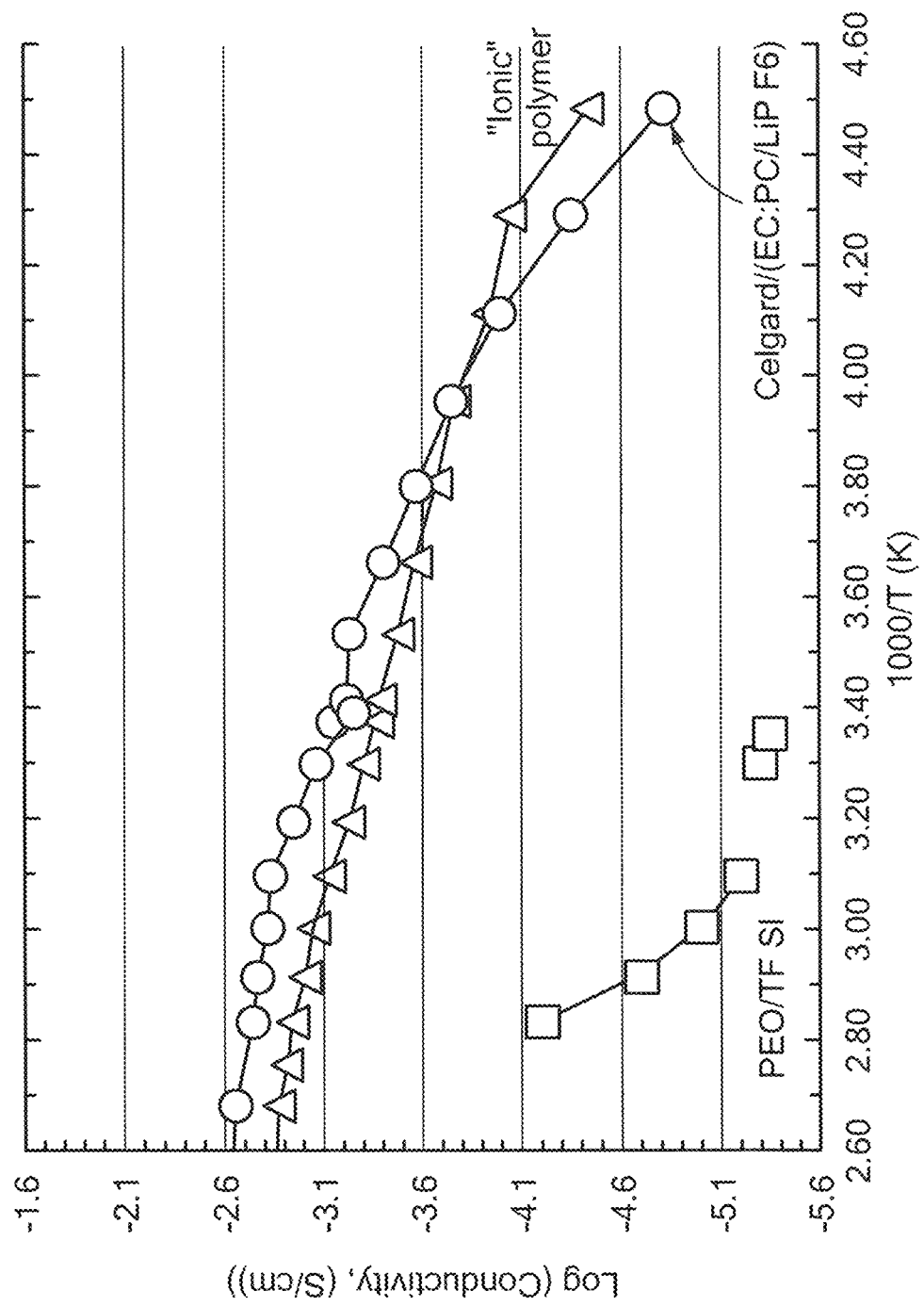
FIG. 15 exemplarily illustrates a plot of the conductivity of the ionically conductive polymer according to the invention in comparison with a liquid electrolyte and a polyethylene oxide lithium salt compound.

Extruded films have been made in thickness ranges from 0.0003" thick to 0.005". Surface conductivity measurements have been made, and the results are reported in FIG. 15. In FIG. 15, the conductivity of ionically conductive polymer according to the invention (A) is compared with that of trifluoromethane sulfonate PEO (□) and the liquid electrolyte Celgard/(EC:PC/LiP F6) (○). The conductivity of the ionic polymer according to the invention tracks the conductivity of the liquid electrolyte and far surpasses that of trifluoromethane sulfonate PEO at the lower temperatures.

Figure 16:
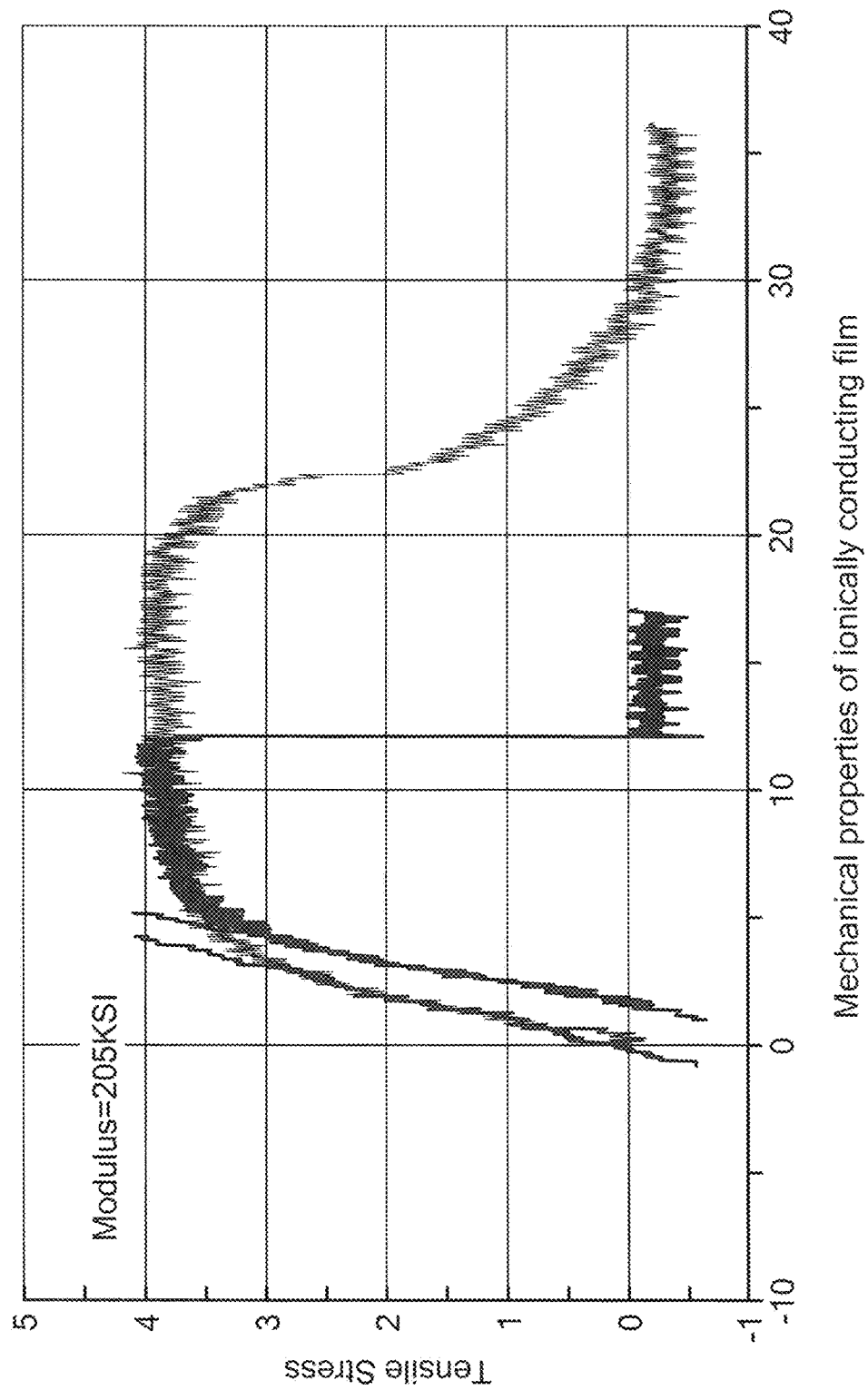
FIG. 16 exemplarily illustrates the mechanical properties of the ionically conducting film according to the invention.

FIG. 16 shows the mechanical properties of the ionically conductive film of the invention which were evaluated using ISPM IPC-TM-650 Test Methods Manual2.4.18.3. In the tensile strength versus elongation curve of FIG. 16, the "ductile failure" mode indicates that the material can be very robust.

Figure 17:
FIG. 17 exemplarily shows a UL94 flammability test conducted on a polymer according to the invention.

Flammability of the polymer was tested using a UL94 flame test. For a polymer to be rated UL94-V0, it must "self-extinguish" within 10 seconds and 'not drip". The electrolyte was tested for this property and it was determined that it self-extinguished with 2 seconds, did not drip, and therefore easily passed the V-0 rating. FIG. 17 shows pictures of the result.

Figure 18:
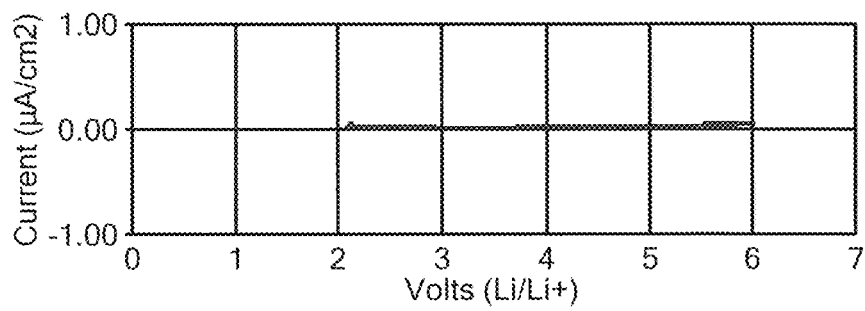
FIG. 18 exemplarily shows a plot of volts versus current of an ionically conductive polymer according to the invention versus lithium metal.

In addition to the properties of ionic conductivity, flame resistance, high temperature behavior, and good mechanical properties, it's necessary that the polymer material not be subject to chemical reaction or attack by lithium metal or other active species of the electrode materials. The traditional test for attack by polymers by lithium is done by the use of cyclic voltammetry. This is a test where the polymer is sandwiched between a lithium metal anode and blocking stainless steel electrode. A voltage is applied and it is swept from a low value (~2 volts) up to a high value greater than 4 volts. The current output is measured to determine if there is any significant reaction happening with the polymer/lithium metal. High output currents would indicate a chemical reaction which is not desirable. FIG. 18 shows the result of this study and indicates that this ionically conductive polymer is stable to at least 6 volts. The results showed good high voltage stability.

The solid polymer electrolyte according to the invention is able to achieve the following properties: A) high ionic conductivity at room temperature and through a wide temperature range (at least −10° C. to +60° C.); B) non-flammability; C) extrudability into thin films allowing for reel-reel processing and a new way of manufacturing; D) compatibility with Lithium metal and other active materials, this invention will allow for the fabrication of a true solid state battery. The invention allows for a new generation of batteries having the following properties:

No safety issues;
New form factors;
Large increases in energy density; and
large improvements in cost of energy storage.

Figure 19:
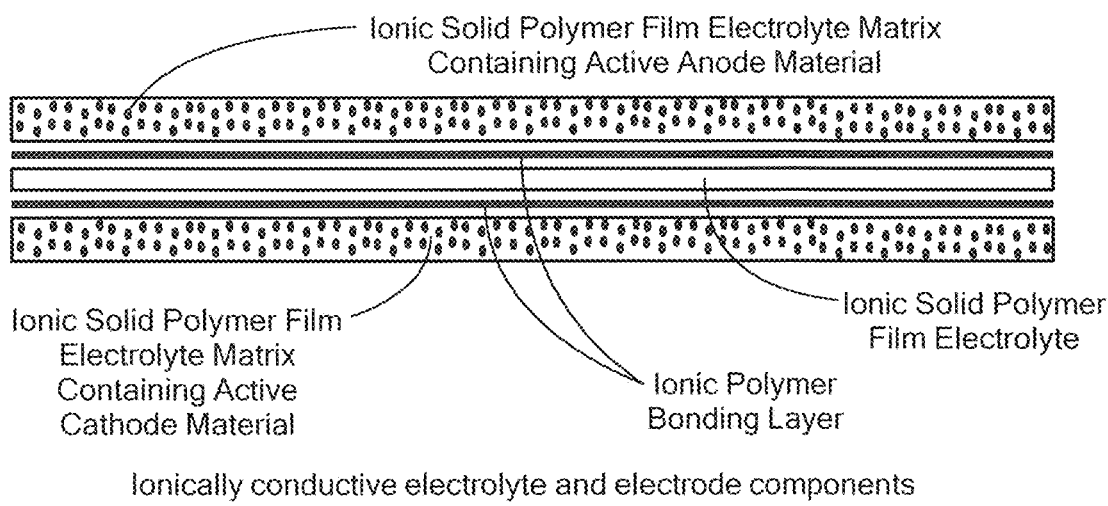
FIG. 19 exemplarily illustrates a schematic of extruded ionically conductive electrolyte and electrode components according to the invention.
Figure 20:
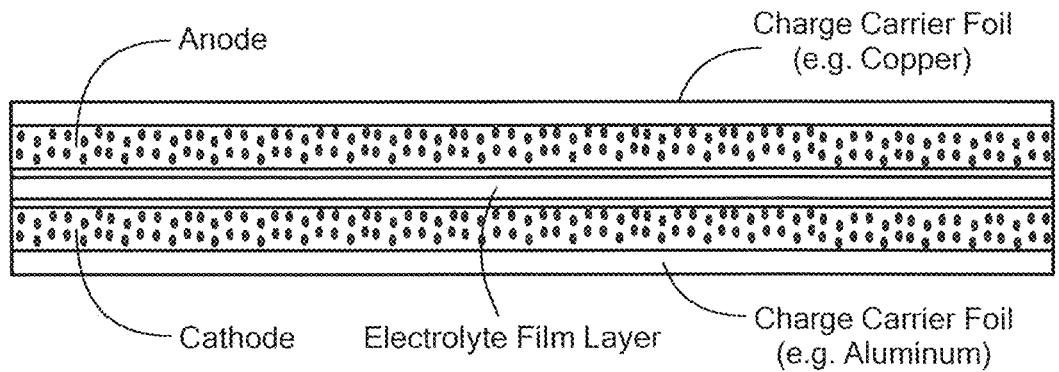
FIG. 20 exemplarily illustrates the solid state battery according to the invention where electrode and electrolyte are bonded together.
Figure 21:
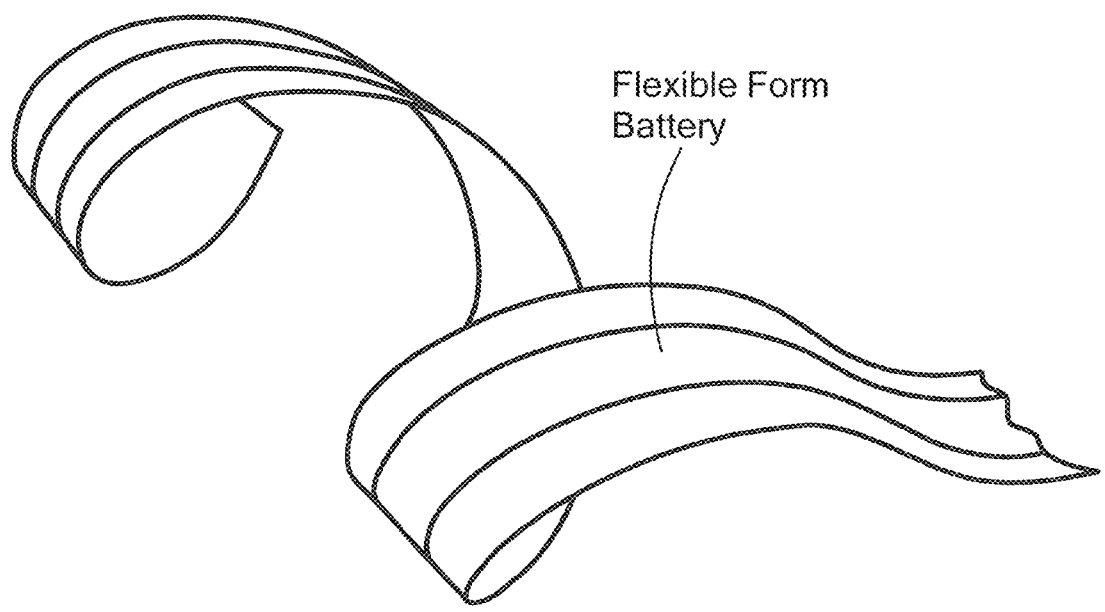
FIG. 21 exemplarily illustrates a final solid state battery according to the invention having a new and flexible form.

FIGS. 19, 20 and 21 show several elements of the solid state battery which are, respectively: A) extruded electrolyte; B) extruded anodes and cathodes; and C) final solid state battery allowing for new form factors and flexibility.

While the present invention has been described in conjunction with preferred embodiments, one of ordinary skill, after reading the foregoing specification, will be able to effect various changes, substitutions of equivalents, and other alterations to that set forth herein. It is therefore intended that the protection granted by Letters Patent hereon be limited only by the definitions contained in the appended claims and equivalents thereof.

The invention claimed is:

1. A solid state battery comprising:
a solid ionically conductive polymer electrolyte having an ionic conductivity greater than $1\times10^{-4}$ S/cm at room temperature, the solid ionically conductive polymer electrolyte formed from
a polymer,
an electron acceptor, and
at least one compound comprising an ion source;
wherein the polymer is polyphenylene sulfide, wherein the polymer has a crystallinity index greater than at least 30% and wherein the compound comprises Li2O or LiOH; and
wherein the electrolyte comprises:
a first surface and a second surface;
a first electrode disposed on the first surface of the solid ionically conductive polymer electrolyte;
a second electrode disposed on the second surface of the solid ionically conductive polymer electrolyte; and
at least a first conductive terminal and a second conductive terminal, each terminal being in electrical contact with respectively the first electrode and the second electrode.

2. The battery of claim 1, wherein the solid ionically conductive polymer electrolyte is a thin film.

3. The battery of claim 1, wherein each of the first and the second electrodes are a thin film disposed respectively on the first surface and second surface of the solid ionically conductive polymer electrolyte.

4. The battery of claim 1, wherein at least one of the first and the second electrodes is extruded.

5. The battery of claim 1, wherein the solid ionically conductive polymer electrolyte is extruded.

6. The battery of claim 1, wherein the first electrode is an anode and comprises the solid ionically conductive polymer electrolyte and a first electrochemically active material.

7. The battery of claim 1, wherein the second electrode is a cathode and comprises the solid ionically conductive polymer electrolyte and a second electrochemically active material.

8. The battery of claim 1, wherein the electrolyte and at least one electrode is co-extruded.

\* \* \* \* \*